United States Patent [19]

Healy

[11] Patent Number: 5,067,397

[45] Date of Patent: Nov. 26, 1991

[54] PINEAPPLE CUTTING AND CORING DEVICE

[76] Inventor: Daniel P. Healy, 10206 Bayport Rd., Louisville, Ky. 40299

[21] Appl. No.: 676,321

[22] Filed: Mar. 28, 1991

[51] Int. Cl.⁵ ............... A23N 4/00; A23N 4/20; A23N 7/00; A23N 7/08
[52] U.S. Cl. .................................. 99/542; 99/544
[58] Field of Search ......... 99/539, 505, 515, 541–545, 99/547, 584, 588, 593, 644; 30/301, 302, 128, 130; 426/482, 484

[56] References Cited

U.S. PATENT DOCUMENTS

| | | | |
|---|---|---|---|
| 419,722 | 1/1890 | Siersdorfer | 99/545 |
| 1,146,085 | 7/1915 | McVey | 99/545 |
| 3,128,810 | 4/1964 | Whipp | 99/545 |
| 4,441,413 | 4/1984 | Mori | 99/593 |
| 4,497,245 | 2/1985 | Mori | 99/547 |
| 4,546,545 | 10/1985 | Hirano | 30/301 |
| 4,606,263 | 8/1986 | Ross et al. | 99/542 |
| 4,653,393 | 3/1987 | Ross | 99/544 |
| 4,690,047 | 9/1987 | Balzano | 30/302 |
| 4,718,333 | 1/1988 | Pierce et al. | 99/589 |

FOREIGN PATENT DOCUMENTS

| | | | |
|---|---|---|---|
| 67866 | 5/1914 | Fed. Rep. of Germany | 99/543 |
| 817351 | 8/1951 | Fed. Rep. of Germany | 99/545 |

*Primary Examiner*—Timothy F. Simone
*Attorney, Agent, or Firm*—Jon C. Winger

[57] ABSTRACT

A pineapple cutting and coring device includes a cutting board base plate for supporting a pineapple, an inside cylindrical cutting blade disposed above the cutting board, an outside cylindrical cutting blade positioned coaxial with the inside cutting blade, and first and second diametrically opposed radial cutting blades outwardly extend from the outside cylindrical blade. A leveraged moving device is suitably attached to the cutting blades and the cutting board base to move the blades downwardly through the pineapple. A stationary guide plate keeps the cutting blades in a vertical orientation as the cutting blades move downwardly through the pineapple.

9 Claims, 2 Drawing Sheets

PINEAPPLE CUTTING AND CORING DEVICE

BACKGROUND OF THE INVENTION

The present invention relates to pineapple cutting devices and more specifically to manually operated devices that remove the inedible core of the pineapple and also that cut and remove the inedible outer shell of the pineapple from the edible flesh.

Various pineapple cutting devices are known. Edward E. Ross U.S. Pat. No. 4,653,393, awarded on Mar. 31, 1987; Kashichi Mori U.S. Pat. No. 4,497,245 awarded on Feb. 5, 1985; and Savino Balzano U.S. Pat. No. 4,690,047 awarded on Sep. 1, 1987 are examples of these.

It is the object of the invention to provide a pineapple cutting and coring device that supplies sufficient mechanical advantage to easily cut entirely through the pineapple.

It is another object of the invention to provide a pineapple cutting and coring device that is of simple construction to facilitate disassembly and repair.

It is yet another object of the invention to provide a pineapple cutting and coring device wherein the components of the device are open providing easy access to the components for the purpose of cleaning.

SUMMARY OF THE INVENTION

A pineapple cutting and coring apparatus has a cutting board base plate for supporting a pineapple in an upright position and for resisting cutting force applied to the pineapple. An inside cylindrical blade for separating the core of the pineapple from the edible flesh of the pineapple is in a vertical orientation with the cutting edge at the bottom end and disposed above the cutting board base plate. An outside cylindrical blade for removing the outer shell of the pineapple from the edible flesh is positioned coaxial to the inside cylindrical cutting blade with the cutting edge of the outside cylindrical blade coplanar with the cutting edge of the inside cylindrical blade. A first radial cutting blade extends outwardly from the outside cylindrical cutting blade and a second radial cutting blade diametrically opposed and radially symmetric with respect to the radial first radial cutting blade extends outwardly from the outside cylindrical cutting blade. The cutting edges of the first and second radial cutting blades are coplanar with the cutting edge of the outer cylindrical blade. A leveraged device for moving the cutting blades through the pineapple is suitably attached to the blades. A stationary guide means for keeping the cutting blades in a vertical orientation as the blades move through the pineapple is mounted to the cutting board base plate.

BRIEF DESCRIPTION OF THE DRAWINGS

The various objectives and features of the present invention will become even more clear upon reference to the following discussion in conjunction with the accompanying drawings wherein like numerals refer to like parts throughout the several figures in which.

DETAILED DESCRIPTION OF THE EMBODIMENTS

Figure 1:
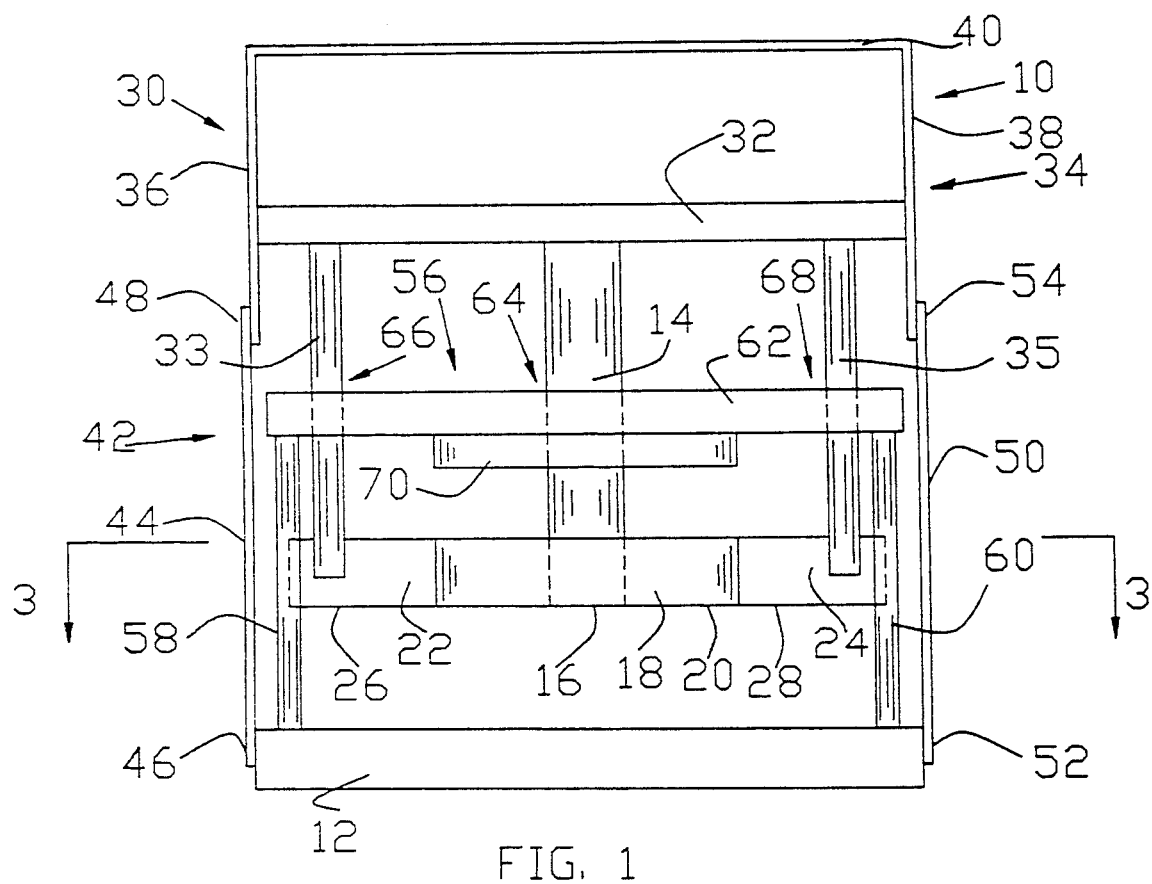
FIG. 1 is a front view of the present invention.
Figure 2:
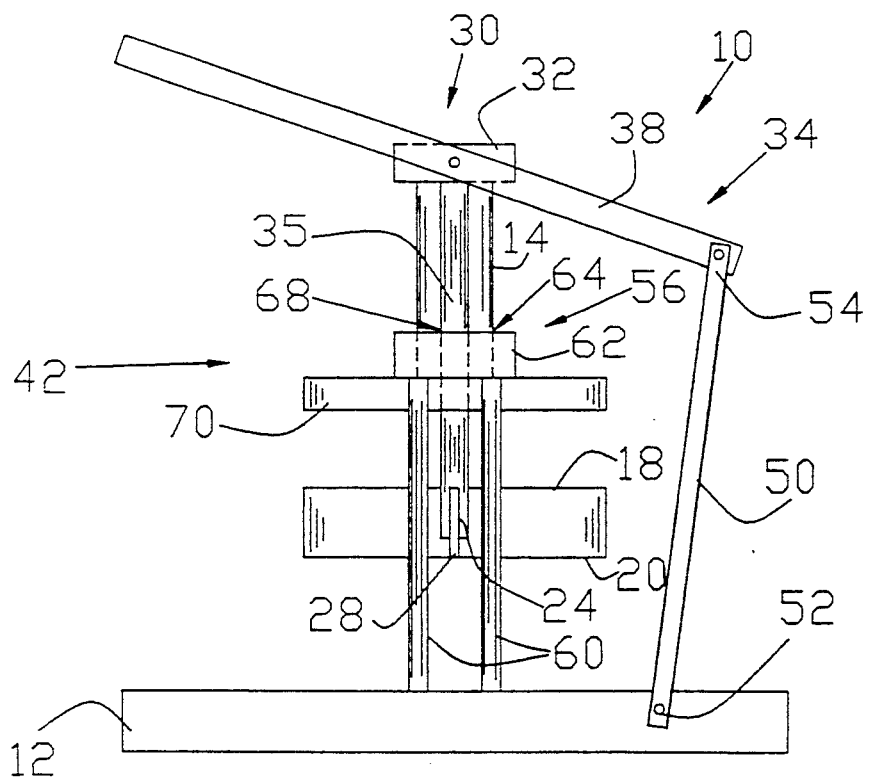
FIG. 2 is a side view of the present invention.
Figure 3:
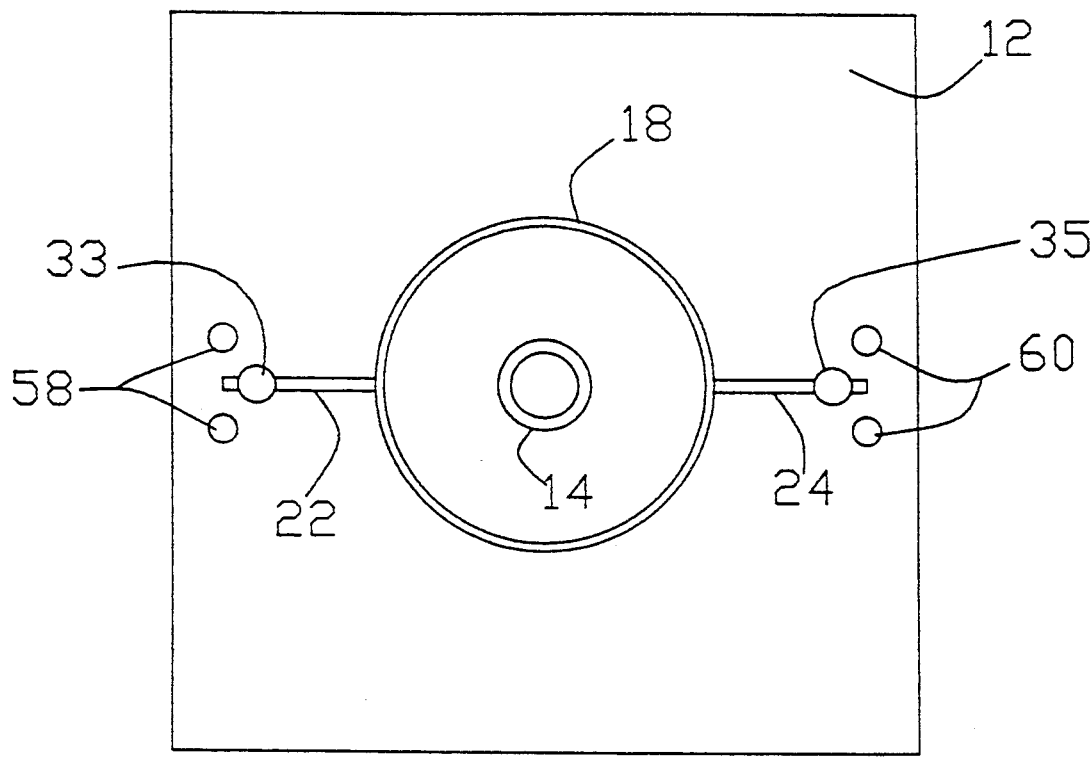
FIG. 3 is a cross-sectional top view of the present invention as seen in the direction of the arrows 3—3 in FIG. 1; and, FIG. 4 is a top view of the cutting board base plate component of the present invention including a groove feature of the present invention.

With reference to FIGS. 1, 2, and 3 there is shown a pineapple cutting and coring device 10 of the present invention. The device 10 includes a cutting board base plate 12 for supporting a pineapple in a generally upright position. An inside cylindrical cutting blade 14 disposed above the base plate 12 in a verticle orientation with a cutting edge 16 at the bottom end of the inside cylindrical cutting blade 14. An outside cylindrical cutting blade 18 is positioned coaxially with the inside cylindrical cutting blade 14 with a cutting edge 20 at its bottom end. The cutting edge 20 of the outside cylindrical cutting blade 18 is coplanar with the cutting edge 16 of the inside cylindrical cutting blade 14.

A first radial cutting blade 22 extends outwardly from the outside cylindrical cutting blade 18. The cutting edge 26 of the first radial cutting blade 22 at the bottom edge of the blade 22 is coplanar with the cutting edge 16 of the inside cylindrical cutting blade 14 and the cutting edge 20 of the outside cylindrical cutting blade 18.

A second radial cutting blade 24 diametrically opposed radially symmetric with respect to the first radial cutting blade 22 extends outwardly from the outside cylindrical cutting blade 18. The cutting edge 26 of the first radial cutting blade 22 at the bottom edge of the blade 22, and the cutting edge 28 of the second radial cutting blade 24 are coplanar with the cutting edge 16 of the inside cylindrical cutting blade 14 and the cutting edge 20 of the outside cylindrical cutting blade 18.

The pineapple cutting and coring device 10 also includes blade moving means 30 for moving the cutting blades 14, 18, 22, 24 up and down toward and away from the cutting board base plate 12 and therefor through the pineapple. The blade moving means 30 includes an elongated cross member 32 located over the cutting blades 14, 18, 22, and 24, and mounted to the end of the inside cylindrical cutting blade 14 opposite the cutting edge 16. The moving means 30 also includes first 33 and second 35 outside cylindrical blade mounting rods with the top ends of each of the first 33 and second 35 mounting rods attached to the cross member 32 and depending therefrom. The bottom end of the first outer blade mounting rod 33 is connected to the distal end of the first radial cutting blade 22, and the bottom end of the second outer blade mounting rod 35 is connected to the distal end the second radial cutting blade 24. Lever arm means, generally denoted as the numeral 34, is attached to the cross member 32 providing a mechanical advantage that allows the cutting blades 14, 18, 22, 24 to be easily moved up and down. Lever arm means 34 consists of, for example, first 36 and second 38 lever arms spaced apart and parallel to each other and a handle 40 extending between the first 36 and second 38 lever arms. The first lever arm 36 is pivotally attached between its ends to one end of the cross member 32 and the second lever arm 38 is pivotally attached between its ends to the end of the cross member 32. The lever arm means 34 further includes interconnecting means 42 formed by, for example, a first interconnecting bar 44 pivotally connected at a first end 46 to the cutting board base plate 12 and pivotally connected at a second end 48 to the fulcrum end of the first lever arm 36, and a second interconnecting bar 50 spaced apart and parallel to the first interconnecting bar 44 pivotally connected at a first end 52 to the cutting board base plate 12 and pivotally connected at a second end 54 to the fulcrum end of the second lever arm 38 thereby connecting the lever arms 36 and 38 to the cutting board base plate 12.

The pineapple cutting and coring device 10 further includes a stationary guide means 56 including a stationary guide plate 62 supported above the cutting board base plate 12 by a first pair of guide plate support posts 58 in a verticle orientation, and connected at their bottom ends to the cutting board base plate 12 at a location adjacent the distal end of the first radial cutting blade 22, with the first radial cutting blade 22 extending between the two support posts of the pair of support posts 58, and a second pair of guide support posts 60 parallel to the first pair of guide support posts 58 and attached at their bottom ends to the cutting board base plate 12 at a location adjacent the distal end of the second radial cutting blade 24 with the second radial cutting blade 24 extending between the two support posts of one pair of support posts 60. The stationary guide plate 62 is attached at a first end to the top ends of each post of the first pair of guide plate support posts 58, and is attached at a second end to the top ends of each post of the second pair of guide plate support posts 60. The stationary guide plate 62 has a central aperture 64 formed therein for slidably receiving the inside cylindrical cutting blade 14. The stationary guide plate 62 also has a first side aperture 66 for slidably receiving the first outer blade mounting rod 33 and a second side aperture 68 for slidably receiving the second outer blade mounting rod 35.

The pineapple cutting and coring device 10 further includes a pineapple retaining disk 70 attached to the bottom side of the stationary guide plate 62 coaxially surrounding the inside cylindrical cutting blade and having an outside circumference substantially equal to the circumference of the outside cylindrical cutting blade 18. The pineapple retaining disk 70 functions to resist upward movement of the edible portion of the pineapple with the cylindrical blades 14 and 18, as the cylindrical blades 14 and 18 are moved upwardly after a cutting and coring operation.

Figure 4:
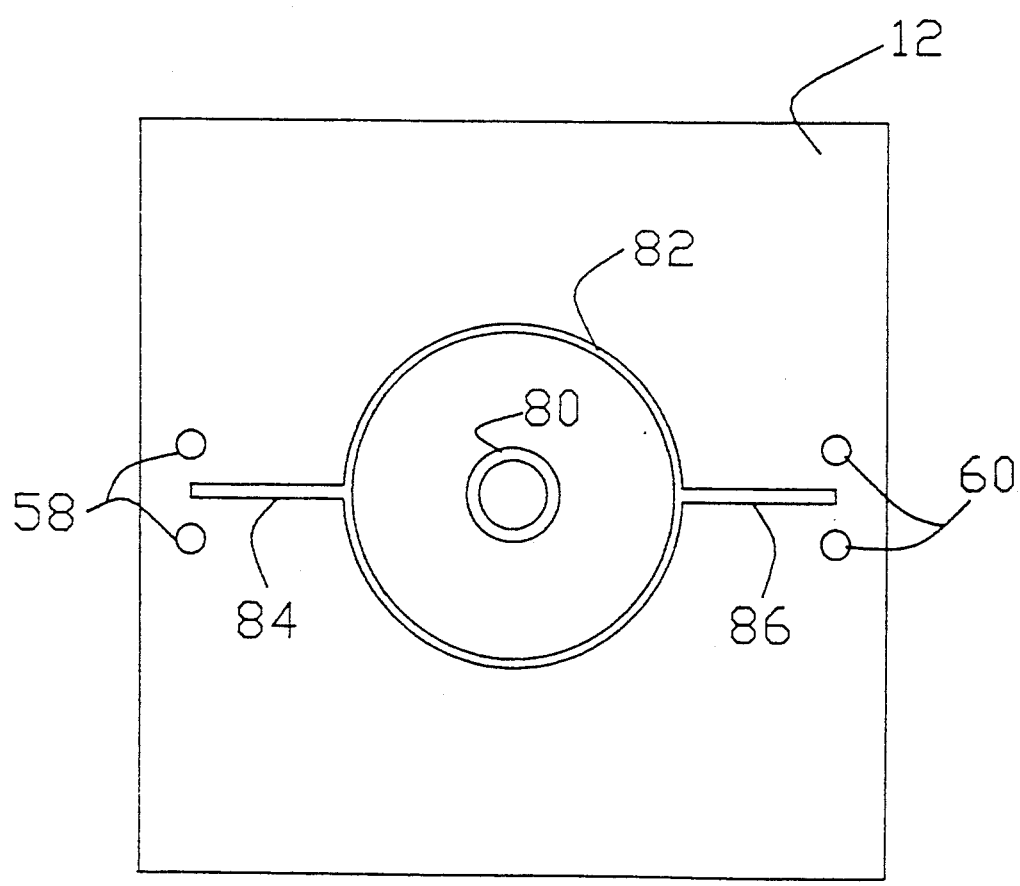

With reference to FIG. 4 there is shown the top surface of the cutting board base plate 12 which includes an inside circular groove 80 for receiving the cutting edge 16 of the inside cylindrical blade 14, a outside circular groove 82 for receiving the cutting edge 20 of the outside cylindrical blade 18, a first radial groove 84 for receiving the cutting edge 26 of the first radial cutting blade 22 extending radially outwardly from the outside circular groove 82, and a second radial groove 86 for receiving the cutting edge 28 of the second radial cutting blade 24 extending outwardly from the outside circular groove 82 in diametric opposition to the first radial groove 84. When the cutting blades 14, 18, 22 and 24 have been moved downwardly, they are received in their respective receiving grooves 80, 82, 84 and 86 to assure that the cutting blades 14, 18, 22 and 24 have passed entirely through the pineapple on the base plate ensuring that a complete cut has been made through the pineapple.

The foregoing detailed description is given primarily for clearness of understanding and no unnecessary limitations are to be understood therefrom for modifications will become obvious to those skilled in the art and may be made without departing from the spirit of the invention and scope of the appended claims.

I claim:

1. A pineapple cutting and coring apparatus, comprising:

a cutting board base plate for supporting a pineapple in an upright position and for resisting a cutting force applied to the pineapple;

an inside cylindrical cutting blade for separating the core of a pineapple from the flesh of a pineapple located above and perpendicular to the cutting board;

an outside cylindrical blade disposed coaxially around the inner cylindrical blade for removing the shell from the flesh of the pineapple on the cutting board;

first and second diametrically opposed radially symmetric cutting blades extending outwardly from the outside cylindrical blade for splitting the outer shell of the pineapple into halves;

blade moving means for moving the concentric inside blade, outside blade and radial blades in unison downwardly toward and upwardly away from the cutting board; and stationary blade guide means located a distance above the cutting board slidably engaging the outer perimeter of the inside cylindrical cutting blade for guiding the inside cylindrical cutting blade, outside cylindrical cutting blade and radial blades as they are moved downwardly toward and upwardly away from the cutting board.

2. The pineapple cutting and coring apparatus of claim 1, further comprising:

an inside circular groove formed in the top surface of the cutting board of substantially the same circumference as the inside cylindrical cutting blade in concentrical alignment with the inside cylindrical cutting blade for receiving the cylindrical cutting edge of the inside cylindrical cutting blade when the inside cylindrical cutting blade has been moved to the full extent downwardly;

an outside circular groove formed in the top surface of the cutting board of substantially the same circumference as the outside cylindrical cutting blade in concentrical alignment with the outside cylindrical cutting blade for receiving the cylindrical cutting edge of the outside cylindrical cutting blade when the outside cylindrical cutting blade has been moved to the full extent downwardly;

first and second diametrically opposed radially symmetric radial grooves formed in the top surface of the cutting board extending outwardly from the outside circular groove, the first radial groove being in alignment with the first radial cutting blade and the second radial groove being in alignment with the second radial cutting blade for receiving the cutting edges of the radial cutting blades when the radial cutting blades have been moved to the full extent downwardly.

3. The pineapple cutting and coring apparatus of claim 1, wherein the stationary blade guide means comprises:

a first pair of vertical support posts attached at their bottom ends to the cutting board base plate adjacent the distal end of the first radial cutting blade;

a second pair of vertical support posts attached at their bottom ends to the cutting board base plate adjacent the distal end of the second radial cutting blade; and, a stationary guide plate parallel to and spaced above the cutting board bottom plate attached at its first end to the top ends of the first pair of vertical support posts and attached at its second end to the top ends of the second pair of vertical support posts, and a central aperture slidably receiving the inside cylindrical cutting blade therethrough.

4. The pineapple cutting and coring apparatus of claim 1, wherein the blade moving means comprises:

a cross member mounted to the end of the inside cylindrical cutting blade opposite the cutting edge; and a lever means interconnecting the fulcrum end of the lever arm to the cutting board base plate.

5. The pineapple cutting and coring apparatus of claim 4, wherein the interconnecting means comprises:

an interconnecting bar pivotally connected at a first end to the cutting board base plate; and pivotally connected at a second end to the fulcrum end of the lever arm.

6. The pineapple cutting and coring apparatus of claim 5, wherein:

A. the lever arm comprises:
   first and second lever arms spaced apart and parallel to each other; and,
   a handle extending between the distal ends of the first and second lever arms and attached to the first and second lever arms;

B. the interconnecting bar comprising:
   a first interconnecting bar pivotally connected at a first end to the cutting board base plate and pivotally connected at a second end to the fulcrum end of the first lever arm; and,
   a second interconnecting bar pivotally connected at a first end to the cutting board base plate and pivotally connected at a second end to the fulcrum end of the second lever arm; and C. the cross member extends between the first lever arm and the second lever arm, and is pivotally connected to each of the first and second lever arms.

7. The pineapple cutting and coring apparatus of claim 1, wherein the blade moving means comprises:

a cross member located above the base plate and mounted to the end of the inside cylindrical cutting blade opposite the cutting edge;

a lever arm connected to the cross member;

a means interconnecting the lever arm to the cutting board base plate; and first and second spaced-apart, parallel cylindrical outer blade mounting rods depending from the cross member, the extending end of the first mounting rod being connected to the first radial cutting blade, and the depending end of the second mounting rod being connected to the second radial cutting blade.

8. The pineapple cutting and coring apparatus of claim 7, wherein the stationary blade guide means comprises:

a first pair of vertical support posts attached at their bottom ends to the cutting board base plate adjacent the distal end of the first radial cutting blade;

a second pair of vertical support posts attached at their bottom ends to the cutting board base plate adjacent the distal end of the second radial cutting blade;

a stationary guide plate parallel to and spaced above the cutting board bottom plate attached at its first end to the top ends of the first pair of vertical support posts and attached at its second end to the top ends of the second pair of vertical support posts;

a central aperture formed in the stationary buide plate for slidably receiving the inside cylindrical cutting blade for keeping the inside cylindrical cutting blade in a vertical orientation, a first side aperture formed in the stationary guide plate for slidably receiving the first outer blade mounting rod; and a second side aperture formed in the stationary guide plate for slidably receiving the second outer blade mounting rod.

9. The pineapple cutting and coring apparatus of claim 1, wherein the stationary blade guide means further comprises a pineapple retaining disk coaxially surrounding the inside cylindrical cutting blade and having an outside circumference substantially equal to the circumference of the outside cylindrical cutting blade.

* * * * *